(12) United States Patent
Shiiyama et al.

(10) Patent No.: US 10,857,901 B2
(45) Date of Patent: *Dec. 8, 2020

(54) MANAGEMENT DEVICE, MANAGEMENT SYSTEM, AND COMPUTER-READABLE STORAGE MEDIUM

(71) Applicant: HONDA MOTOR CO., LTD., Tokyo (JP)

(72) Inventors: Takumi Shiiyama, Saitama (JP); Ryo Oshima, Saitama (JP); Ryuichi Kimata, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/559,635

(22) Filed: Sep. 4, 2019

(65) Prior Publication Data

US 2019/0389326 A1 Dec. 26, 2019

Related U.S. Application Data

(63) Continuation of application No. PCT/JP2018/011643, filed on Mar. 23, 2018.

(30) Foreign Application Priority Data

Mar. 23, 2017 (JP) ................................ 2017-057895

(51) Int. Cl.
*B60L 53/65* (2019.01)
*B60L 53/80* (2019.01)
(Continued)

(52) U.S. Cl.
CPC .............. *B60L 53/65* (2019.02); *B60L 53/80* (2019.02); *B60S 5/06* (2013.01); *H04L 67/12* (2013.01); *H04W 4/40* (2018.02)

(58) Field of Classification Search
CPC ............ B60L 53/65; B60L 53/80; B60S 5/06; H04W 4/40; H04L 67/12
See application file for complete search history.

(56) References Cited

U.S. PATENT DOCUMENTS 10,027,153 B2    7/2018  Toya
10,055,911 B2 *  8/2018  Luke .................... B60L 1/14
(Continued)

FOREIGN PATENT DOCUMENTS

JP    2001057711 A    2/2001
JP    2009151557 A    7/2009
(Continued)

OTHER PUBLICATIONS

International Search Report and (ISA/237) Written Opinion of the International Search Authority for International Patent Application No. PCT/JP2018/011643, dated Apr. 17, 2018.
(Continued)

*Primary Examiner* — Yazan A Soofi
*Assistant Examiner* — Naeem Taslim Alam

(57) ABSTRACT

A management device manages batteries. The management device includes an obtaining portion that obtains, from batteries, specific information that specifies identification information of a vehicle that has used the batteries. The management device includes an authenticating portion that authenticates a user by using the specific information obtained from the batteries. The management device includes a replacement receiving portion that receives replacement of the batteries if the authenticating portion authenticates the user.

9 Claims, 7 Drawing Sheets

(51) Int. Cl.
*B60S 5/06* (2019.01)
*H04W 4/40* (2018.01)
*H04L 29/08* (2006.01)

(56) References Cited

U.S. PATENT DOCUMENTS

| | | | |
|---|---|---|---|
| 10,065,525 B2 | 9/2018 | Chen | |
| 10,158,102 B2 | 12/2018 | Wu | |
| 10,186,094 B2 | 1/2019 | Wu | |
| 10,209,090 B2* | 2/2019 | Luke | B60L 50/40 |
| 10,345,843 B2 | 7/2019 | Luke | |
| 2008/0281732 A1* | 11/2008 | Yamada | H01M 10/425 705/30 |
| 2010/0185357 A1* | 7/2010 | Mizumachi | B60L 53/11 701/31.4 |
| 2011/0066309 A1* | 3/2011 | Matsuoka | H01M 10/482 701/22 |
| 2013/0026971 A1 | 1/2013 | Luke | |
| 2013/0030580 A1 | 1/2013 | Luke | |
| 2013/0030581 A1 | 1/2013 | Luke | |
| 2013/0030608 A1* | 1/2013 | Taylor | G06Q 30/0259 701/2 |
| 2013/0030630 A1 | 1/2013 | Luke | |
| 2013/0030920 A1 | 1/2013 | Wu | |
| 2013/0033203 A1 | 2/2013 | Luke | |
| 2013/0116892 A1 | 5/2013 | Wu | |
| 2014/0142786 A1 | 5/2014 | Huang | |
| 2014/0247121 A1* | 9/2014 | Satake | B60R 25/00 340/426.11 |
| 2014/0251710 A1 | 9/2014 | Juan | |
| 2014/0253021 A1* | 9/2014 | Luke | H02J 5/00 320/107 |
| 2014/0266006 A1 | 9/2014 | Luke | |
| 2014/0277844 A1 | 9/2014 | Luke | |
| 2014/0279576 A1 | 9/2014 | Luke | |
| 2015/0042157 A1 | 2/2015 | Chen | |
| 2015/0251716 A1* | 9/2015 | Matsuda | H01M 2/1072 29/593 |
| 2016/0225104 A1* | 8/2016 | Yamaguchi | G06Q 20/145 |

FOREIGN PATENT DOCUMENTS

| | | |
|---|---|---|
| JP | 2011065752 A | 3/2011 |
| JP | 2014525229 A | 9/2014 |
| JP | 2014525230 A | 9/2014 |
| JP | 2014525231 A | 9/2014 |
| JP | 2014527390 A | 10/2014 |
| JP | 2014527689 A | 10/2014 |
| JP | 2014529117 A | 10/2014 |
| JP | 2014529118 A | 10/2014 |
| JP | 2014529119 A | 10/2014 |
| JP | 2014529392 A | 11/2014 |
| JP | 2014529982 A | 11/2014 |
| JP | 2014531699 A | 11/2014 |
| JP | 2014533480 A | 12/2014 |
| JP | 2015502881 A | 1/2015 |
| JP | 2015231837 A | 12/2015 |
| JP | 2015534927 A | 12/2015 |
| JP | 2016514357 A | 5/2016 |
| JP | 2016515063 A | 5/2016 |
| JP | 2016517257 A | 6/2016 |
| JP | 2016521389 A | 7/2016 |
| JP | 2016521393 A | 7/2016 |
| JP | 2016527871 A | 9/2016 |
| JP | 2016533154 A | 10/2016 |
| JP | 2016534518 A | 11/2016 |
| JP | 2016208692 A | 12/2016 |
| WO | 2006090636 A1 | 8/2006 |
| WO | 2015115069 A1 | 8/2015 |

OTHER PUBLICATIONS

Decision to Grant a Patent issued for counterpart Japanese Application No. 2017-057895, drafted by the Japan Patent Office dated Mar. 29, 2018.

Office Action issued for counterpart Japanese Application No. 2017-057895, drafted by the Japan Patent Office dated Feb. 26, 2018.

Office Action issued for counterpart Japanese Application No. 2017-057895, drafted by the Japan Patent Office dated Dec. 11, 2017.

* cited by examiner

| BATTERY ID | ELECTRIC-MOTORCYCLE ID | USER INFORMATION |
|---|---|---|
| A1 | B1 | U1 |
| A2 | B2 | U2 |
| ⋮ | ⋮ | ⋮ |

*FIG. 4*

MANAGEMENT DEVICE, MANAGEMENT SYSTEM, AND COMPUTER-READABLE STORAGE MEDIUM

The contents of the following Japanese patent application and international application are incorporated herein by reference:

Japanese Application No. 2017-057895 filed on Mar. 23, 2017, and

International Application No. PCT/JP2018/011643 filed on Mar. 23, 2018.

BACKGROUND

1. Technical Field

The present invention relates to a management device, a management system, and a computer-readable storage medium.

2. Related Art

An energy supplying station is known that has a function that stores a group of batteries fully charged (refer to Patent Literature 1).

CITATION LIST

Patent Literature

[Patent Literature 1] Japanese Patent Application Publication No. 2001-57711

BRIEF DESCRIPTION OF THE DRAWINGS

FIG. 4 illustrates in a table an example of information a storage portion 140 of a management server 102 stores.

DESCRIPTION OF EXEMPLARY EMBODIMENTS

Figure 1A:
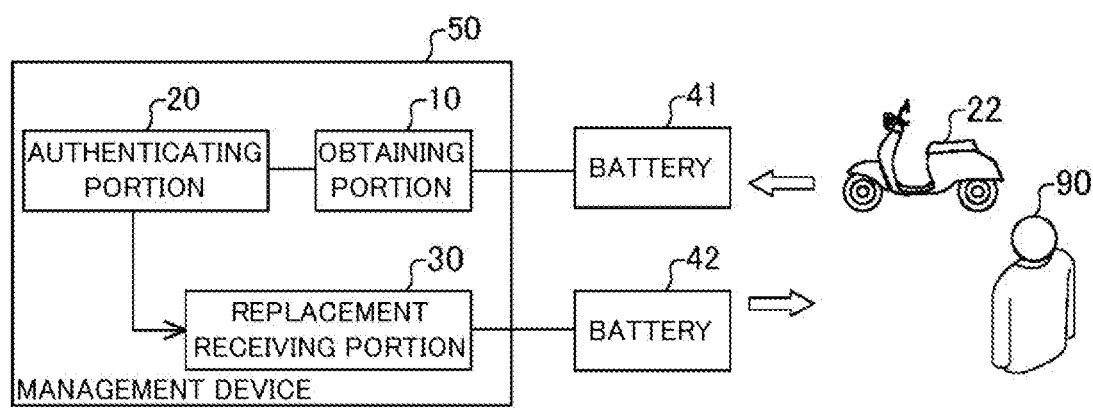
FIG. 1A schematically illustrates an example of system configurations of a management device 50.

Hereinafter, the present invention is described with reference to an embodiment of the invention. However, the embodiment described below does not limit the invention related to the claims. All combinations of characteristics described in the embodiment are not necessarily essential to solution of the invention. The same reference numerals are assigned to the same or similar portions in the drawings, and repeated descriptions may be omitted.

FIG. 1A schematically illustrates an example of system configurations of a management device 50. The management device 50 is a management device that manages batteries. The management device 50 receives replacement of a battery 41. More specifically, the management device 50 replaces the battery 41 an electric motorcycle 22 uses with a battery 42. Even more specifically, the management device 50 receives the battery 41 from a user 90, and supplies the battery 42 to the user 90.

The battery 41 and the battery 42 are secondary batteries, such as lithium-ion batteries, nickel-hydrogen batteries, and lead-acid batteries. The battery 41 and the battery 42 are attachable to and detachable from the management device 50. For example, the battery 41 is a battery that has been used. For example, the battery 42 is a battery that has been charged.

The management device 50 includes an obtaining portion 10, an authenticating portion 20, and a replacement receiving portion 30. The obtaining portion 10 obtains, from the battery 41, specific information that specifies identification information of the electric motorcycle 22 that has used the battery 41. The authenticating portion 20 authenticates the user 90 by using the specific information obtained from the battery 41. The replacement receiving portion 30 receives replacement of the battery 41 if the authenticating portion 20 authenticates the user 90.

The management device 50 authenticates the user 90 by using the identification information of the electric motorcycle 22 stored in the battery 41 that has been used the management device 50 has received from the user 90. Therefore, the management device 50 allows the user 90 not to use a user card of the management device or a user terminal to perform authentication operation. For example, the user 90 performs authentication of the user 90 by bringing the battery 41 to the management device 50 and attaching the battery 41 to the management device 50. Therefore, the user 90 does not need to use a user card or a user terminal while having the battery 41. Consequently, the management device 50 significantly reduces labor of replacement of batteries from the user 90.

The portions of the management device 50 may be implemented by hardware, may be implemented by software, or may be implemented by hardware and software. If at least part of constituent elements that constitute the management device 50 are implemented by software, the constituent elements implemented by the software may be implemented by software or program that defines operation related to the constituent elements and is run by an information processing device that has a general configuration. The above information processing device may include (i) a data processing device that includes processors, such as a central processing unit (CPU) and a graphics processing unit (GPU), a read-only memory (ROM), a random-access memory (RAM), and a communication interface, (ii) input devices, such as a keyboard, a touch screen, a camera, a microphone, various sensors, and a global positioning system (GPS) receiver, (iii) output devices, such as a display, a speaker, and a vibrator, and (iv) storage devices (that include an external storage device), such as a memory and a hard disk drive (HDD). In the above information processing device, the above data processing device or storage devices may store the above software or program. The above software or program run by a processor allows the above information processing device to execute operation defined by the software or program. The above software or program may be stored in a non-transitory computer-readable storage medium.

The above software or program may be program that controls the management device 50. For example, the above program allows a computer to execute an obtaining procedure that obtains, from the battery 41, specific information that specifies identification information of the electric motorcycle 22 that has used the battery 41, an authenticating procedure that authenticates the user 90 by using the specific information obtained from the battery 41, and a replacement receiving procedure that receives replacement of the battery 41 if the user 90 is authenticated by the authenticating procedure. The above computer may function as the management device 50. The above computer may be a processing device, such as a processor, that executes functions of the management device 50.

Figure 1B:
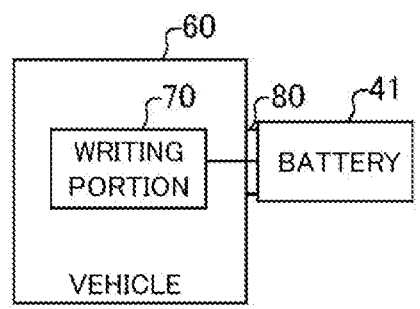
FIG. 1B schematically illustrates an example of system configurations of a vehicle 60.

FIG. 1B schematically illustrates an example of system configurations of a vehicle 60. The vehicle 60 operates by electrical energy stored in the battery 41. The battery 41 is attached to an attachment portion 80. When the battery 41 is attached to the attachment portion 80, a writing portion 70 writes, to the battery 41, specific information that specifies identification information of the vehicle 60. The electric motorcycle 22 illustrated in FIG. 1A is an example of the vehicle 60.

The vehicle 60 allows the vehicle 60 to which the battery 41 has been attached to be identified after the battery 41 is detached from the vehicle 60. Therefore, the management device that manages batteries determines the vehicle 60 to which the battery 41 has been attached. Consequently, the management device that manages batteries uses the battery 41 to authenticate a user based on the vehicle 60.

Figure 2:
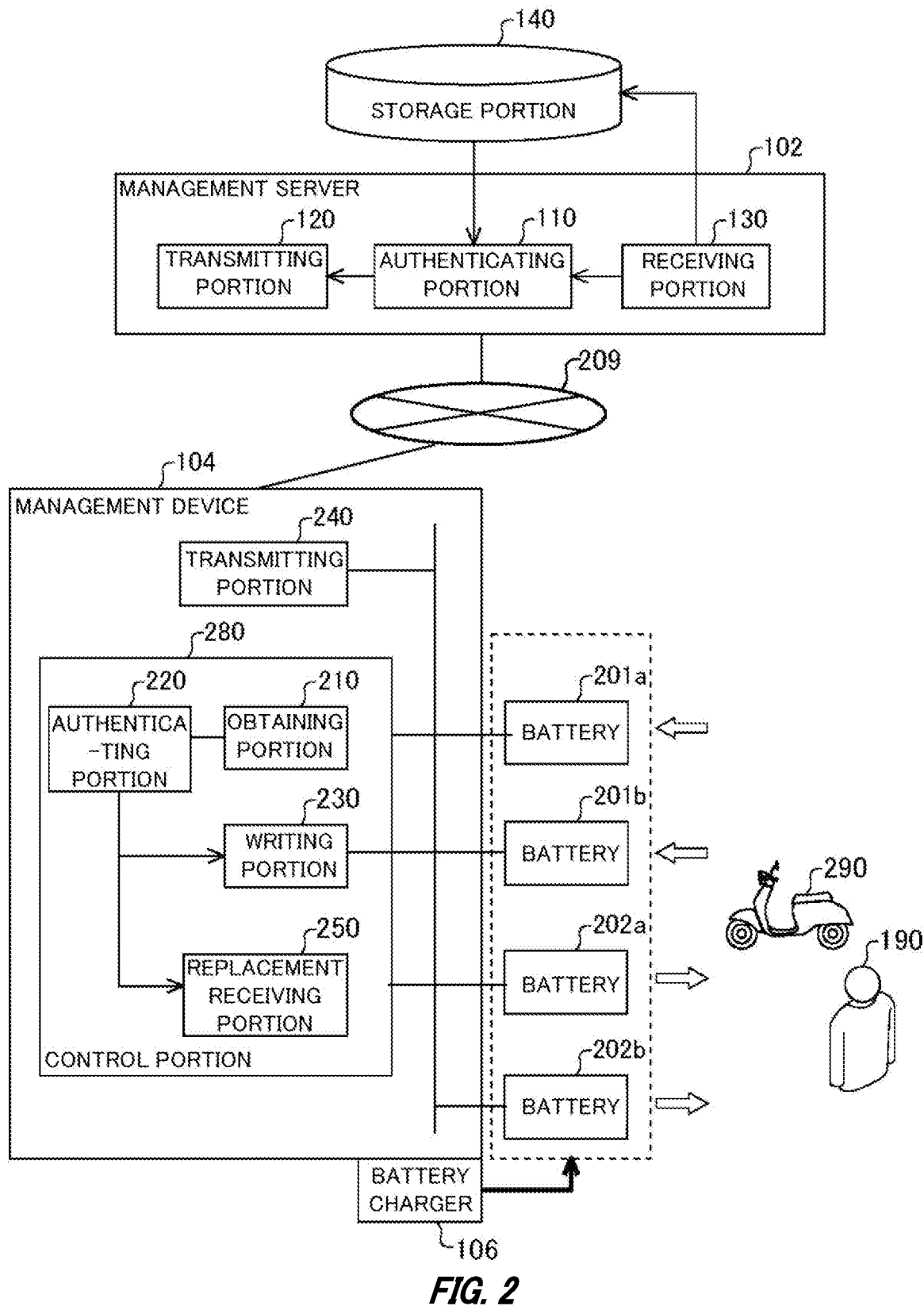
FIG. 2 schematically illustrates an example of whole configurations of a management system 100.

FIG. 2 schematically illustrates an example of whole configurations of a management system 100. The management system 100 is outlined with reference to FIG. 2. The management system 100 includes a management server 102, a management device 104, and a battery charger 106.

The management device 104 manages a battery 201*a*, a battery 201*b*, a battery 202*a*, and a battery 202*b*. The battery 201*a*, the battery 201*b*, the battery 202*a*, and the battery 202*b* are secondary batteries, such as lithium-ion batteries, nickel-hydrogen batteries, and lead-acid batteries. The battery 201*a*, the battery 201*b*, the battery 202*a*, and the battery 202*b* are attachable to and detachable from the management device 104. When the battery 201*a*, the battery 201*b*, the battery 202*a*, and the battery 202*b* are attached to the management device 104, the battery 201*a*, the battery 201*b*, the battery 202*a*, and the battery 202*b* are attached to the battery charger 106.

The battery charger 106 uses electrical energy supplied from an external power supply to charge the battery 202*a*, the battery 202*b*, a battery 201*a*, and a battery 201*b*. The external power supply may include an electrical grid or an electric generator, for example. The electric generator may include a natural-energy electric generator.

The battery 201*a* and the battery 201*b* are batteries that have been used. The battery 201*a* and the battery 201*b* may be collectively referred to as the batteries 201. The battery 202*a* and the battery 202*b* are batteries that have been charged. The battery 202*a* and the battery 202*b* may be collectively referred to as the batteries 202. The batteries 201 and the batteries 202 may be collectively referred to as the "batteries" if the batteries 201 and the batteries 202 do not need to be particularly discriminated.

An electric motorcycle 290 operates by electrical energy of the battery 201*a* and the battery 201*b*. The electric motorcycle 290 operates by electrical energy of the battery 202*a* and the battery 202*b*. In the present embodiment, the electric motorcycle 290 operates by electrical energy of two batteries. If the electric motorcycle 290 uses two or more batteries, it is demanded to appropriately manage the plurality of batteries.

The batteries attached to the electric motorcycle 290 supply electrical energy to the electric motorcycle 290. The electric motorcycle 290 runs by converting electrical energy supplied from the batteries into power. The electric motorcycle 290 may use electrical energy supplied from the batteries to operate electrical equipment of the electric motorcycle. The electric motorcycle 290 is an example of vehicles. The vehicles may include electric bicycles, motorcycles, and automobiles. The vehicles may include electric automobiles. The vehicles are an example of transportation equipment. The transportation equipment is an example of movable objects.

The management device 104 communicates with the management server 102 through a communication network 209. The management device 104 constitutes at least part of a battery station that supplies batteries for replacement for the electric motorcycle 290. The management device 104 controls charging of batteries to allow batteries that have been charged to be always supplied.

The communication network 209 may include transmission channels of wired communication, and may include transmission channels of wireless communication. The communication network 209 may include a packet-radio network, the Internet, a peer-to-peer (P2P) network, a private line, a virtual private network (VPN), and power-line communication. The communication network 209 may include (i) a mobile communication network, such as a mobile-phone line network, and may include (ii) wireless communication networks, such as wireless metropolitan area network (Wireless MAN) (e.g. worldwide interoperability for microwave access (WiMAX (registered trademark)), a wireless local area network (wireless LAN) (e.g. Wi-Fi (registered trademark)), Bluetooth (registered trademark), Zigbee (registered trademark), and near field communication (NFC).

Operation of the management system 100 is outlined. A user 190 attaches, to the management device 104, the batteries 201 that have been used and have been detached from the electric motorcycle 290. The management device 104 reads authentication information from the batteries 201 that have been attached. The management device 104 authenticates the user 190 by transmitting the authentication information to the management server 102. After the user 190 is authenticated, the user 190 detaches, from the management device 104, the batteries 202 that have been charged, and attaches the batteries 202 to the electric motorcycle 290. If the batteries 202 are detached from the management device 104, the management device 104 asks the management server 102 for billing. The management device 104 appropriately charges the batteries 201 that have been attached.

As illustrated in FIG. 2, the management device 104 includes a control portion 280, and a transmitting portion 240. The control portion 280 includes an obtaining portion 210, an authenticating portion 220, a writing portion 230, and a replacement receiving portion 250.

The management device 104 is a management device that manages the batteries. The management device 104 receives the batteries 201 and supplies the batteries 202.

The obtaining portion 210 obtains, from the batteries 201, specific information that specifies identification information of the electric motorcycle 290 that has used the batteries 201. The authenticating portion 220 authenticates a user by using the specific information obtained from the batteries 201. The replacement receiving portion 250 receives replacement of the batteries 201 if the authenticating portion 220 authenticates the user. Consequently, the user 190 can be authenticated by using authentication information stored in the batteries 201. Therefore, the user 190 can be authenticated without extra labor.

The identification information of the electric motorcycle 290 is information that allows the management system 100 to identify the user 190. If the user 190 purchases the electric motorcycle 290, the user 190 may access the management server 102 at a shop that sells the electric motorcycle 290, for example, and the user 190 may be associated with the identification information of the electric motorcycle 290.

When the batteries 201 are attached to the electric motorcycle 290, the electric motorcycle 290 writes, to the batteries 201, specific information that specifies identification information of the electric motorcycle 290. Consequently, specific information that specifies identification information of the electric motorcycle 290 that has used the batteries 201 is stored in the batteries 201. The specific information may be identification information itself of the electric motorcycle 290. The specific information may be information obtained by converting identification information of the electric motorcycle 290 according to a predetermined process.

The management server 102 stores user information in association with the identification information of the electric motorcycle 290. More specifically, a storage portion 140 of the management server 102 stores user information in association with the identification information of the electric motorcycle 290. The authenticating portion 220 transmits the specific information to the management server 102, and obtains, from the management server 102, a result of authentication of the user. If the management server 102 stores user information in association with identification information of the electric motorcycle 290 specified by the specific information the management server 102 has received from the management device 104, the management server 102 determines that the user 190 is valid. If the management server 102 does not store user information in association with identification information of the electric motorcycle 290 specified by the specific information the management server 102 has received from the management device 104, the management server 102 determines that the user 190 is not valid.

For example, the management server 102 stores user information in association with a combination of identification information of the electric motorcycle 290 and identification information of the batteries 201. The authenticating portion 220 transmits, to the management server 102, a combination of specific information received from the electric motorcycle 290 and identification information of the batteries 201, and obtains, from the management server 102, a result of authentication of a user.

If the authenticating portion 220 authenticates the user 190, the transmitting portion 240 transmits, to the management server 102, identification information of the batteries 202 that is to be supplied to the user 190. After the authenticating portion 220 authenticates the user 190, the transmitting portion 240 may transmit, to the management server 102, identification information of the batteries 202 that is to be supplied to the user 190. The transmitting portion 240 may determine identification information of the batteries 202 that is to be supplied to the user 190 before the authenticating portion 220 authenticates the user 190, and the transmitting portion 240 may transmit, to the management server 102, the identification information of the batteries 202 before the user 190 is authenticated.

If the management server 102 stores user information in association with a combination of identification information of the electric motorcycle 290 specified by specific information the management server 102 has received from the management device 104, and identification information of the batteries 201 the management server 102 has received from the management device 104, the management server 102 determines that the user is valid. If the management server 102 does not store user information in association with the above combination, the management server 102 determines that the user is not valid. If the management server 102 does not store user information in association with the above combination, the management server 102 may notify a user identified based on user information stored in association with the identification information of the batteries.

A receiving portion 130 of the management server 102 receives specific information transmitted by the transmitting portion 240 of the management device 104. More specifically, the receiving portion 130 receives specific information and identification information of the batteries 201 transmitted by the transmitting portion 240 of the management device 104. If the storage portion 140 stores user information in association with a combination of identification information of the electric motorcycle 290 specified by the specific information the receiving portion 130 has received and the identification information of the batteries 201, the authenticating portion 110 determines that the user is valid. On the other hand, if the authenticating portion 110 determines that the storage portion 140 does not store user information in association with the above combination, the transmitting portion 120 notifies a user identified based on user information stored in the storage portion 140 in association with the identification information of the batteries 201. The transmitting portion 120 may notify the user of a warning by means of an electronic mail, for example. Consequently, the user 190 is notified that the batteries 201 may have been stolen from the electric motorcycle 290.

The management system 100 manages the batteries by means of a combination of the identification information of the electric motorcycle 290 and the identification information of the batteries 201. Consequently, a risk that occurs if the batteries are stolen from the electric motorcycle 290 and are used for another electric motorcycle is reduced. For example, if the batteries are stolen and used for another electric motorcycle, specific information that corresponds to identification information of another electric motorcycle is written to the batteries. Therefore, a combination stored in the batteries is different from a combination of identification information of the user 190 and the electric motorcycle 290. Therefore, if the batteries are brought to the management device 104, the management server 102 detects illegal usage of the batteries.

The electric motorcycle 290 uses a plurality of batteries. A plurality of pieces of information may be generated from identification information of the electric motorcycle 290 that has used a plurality of batteries. The plurality of pieces of information as specific information may be dispersedly written to the plurality of batteries, respectively.

More specifically, the electric motorcycle 290 uses the battery 201a and the battery 201b, as described above. If the battery 201a and the battery 201b are attached to the electric motorcycle 290, the electric motorcycle 290 divides the identification information of the electric motorcycle 290 into pieces of the identification information of the electric motorcycle 290, and writes dispersedly the pieces of the identification information of the electric motorcycle 290 to the battery 201a and the battery 201b.

For example, if the identification information of the electric motorcycle 290 is "AABB", "0AA" that is a first half "AA" of the "AABB" to which a prefix "0" that means a first half is added is written to the battery 201a. The electric motorcycle 290 also writes, to the battery 201b, "1BB" that is a second half "BB" of the "AABB" to which a prefix "1" that means a second half is added. If the management server 102 receives "0AA" and "1BB", the management server 102 determines that the identification information of the electric motorcycle 290 is "AABB". Consequently, if a combination of batteries that is different from a combination of the batteries 201 that have been supplied to the electric motorcycle 290 are brought to the management device 104, the fact is appropriately detected. For example, a fact is detected that one of the battery 201*a* and the battery 201*b* that have been supplied has been used for another motorcycle.

As described above, the management device 104 identifies the user 190 by using the batteries the electric motorcycle 290 uses. Therefore, the user 190 is authenticated without extra labor. If a method in which the user 190 is authenticated with a combination of the identification information of the electric motorcycle 290 and the identification information of the batteries 201 is adopted, the batteries are appropriately managed according to a combination of the user 190 and the electric motorcycle 290.

At least part of constituent elements that constitute the management device 104 may be implemented by software, similarly as the management device 50. For example, the control portion 280 may be a processing device, such as a processor, in an information processing device, such as a computer, and at least part of constituent elements that constitute the management device 104 may be implemented by software or program run by the information processing device.

Figure 3:
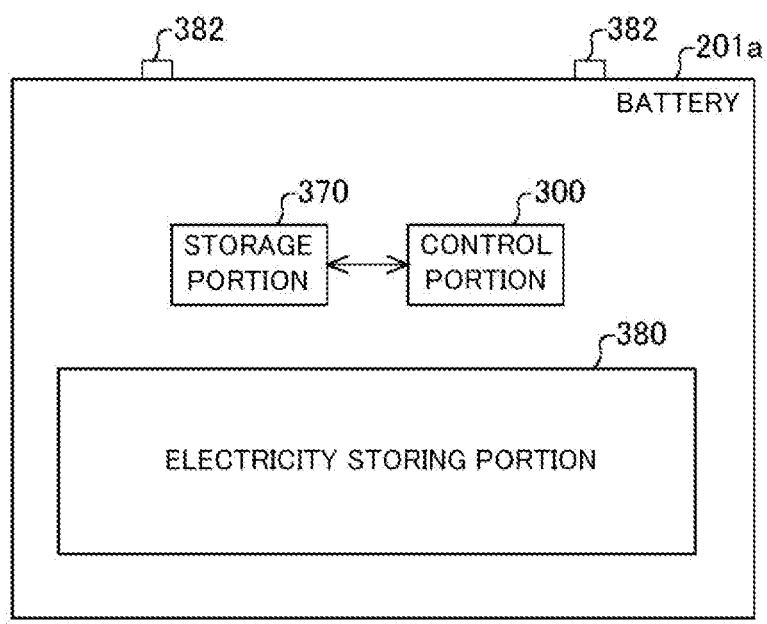
FIG. 3 schematically illustrates an internal configuration of a battery 201.

FIG. 3 schematically illustrates an internal configuration of the battery 201*a*. The battery 201*a* includes a control portion 300, a storage portion 370, an electricity storing portion 380, and terminals 382.

The storage portion 370 stores information used for operation of the control portion 300. The storage portion 370 may include a non-transitory storage medium. The storage portion 370 stores identification information of the battery 201*a*. The storage portion 370 stores specific information that specifies identification information of the electric motorcycle 290. The storage portion 370 may store specific information that specifies identification information of the electric motorcycle 290 in an unwritable storage region. The storage portion 370 may store specific information that specifies identification information of the electric motorcycle 290 in a writable storage region.

The control portion 300 controls the portions of the battery 201*a*. The control portion 300 controls the portions of the battery 201*a*, based on information stored in the storage portion 370.

If the battery 201*a* is attached to the electric motorcycle 290, the control portion 300 communicates with the electric motorcycle 290 to obtain specific information from the electric motorcycle 290. The specific information specifies identification information of the electric motorcycle 290. The control portion 300 writes the obtained specific information to the storage portion 370. If the battery 201*a* is attached to the management device 104, the control portion 300 transmits, to the management device 104 in response to request from the management device 104, the specific information stored in the storage portion 370. The control portion 300 also transmits, to the management device 104 in response to request from the management device 104, identification information of the battery 201*a* stored in the storage portion 370. The control portion 300 may communicate with the electric motorcycle 290 and the management device 104 through power-line communication through the terminals 382.

The electricity storing portion 380 stores electrical energy supplied from the battery charger 106, for example, through the terminals 382. When the battery 201*a* is attached to the electric motorcycle 290, electrical energy stored in the electricity storing portion 380 can be supplied to the electric motorcycle 290 through the terminals 382.

An example of internal configurations of the battery 201*a* has been described with reference to FIG. 3. The battery 201*b*, the battery 202*a*, and the battery 202*b* each have an internal configuration the same as the internal configuration of the battery 201*a*. Therefore, an internal configuration of each of the battery 201*b*, the battery 202*a*, and the battery 202*b* will not be described.

FIG. 4 illustrates in a table an example of information the storage portion 140 of the management server 102 stores. The storage portion 140 stores user information in association with battery ID and electric-motorcycle ID.

The "battery ID" is information of the batteries 201. The "electric-motorcycle ID" is identification information of the electric motorcycle 290. For example, identification information of the electric motorcycle 290 may be "AABB" described above.

The "user information" is information on a user. The "user information" may include identification information of a user. The "user information" may include information on billing for a user, and information on a contract with a user, for example.

The authenticating portion 110 authenticates a user by using information stored in the storage portion 140, and information the receiving portion 130 has received. For example, if the receiving portion 130 receives "A1" as battery ID, and receives "B1" as identification information of the electric motorcycle 290, the authenticating portion 110 determines that a user of the management device 104 is a valid user since user information "U1" is stored in the storage portion 140 in association with "A1" and "B1". That is, the user is authenticated. In that case, the transmitting portion 120 transmits, to the management device 104, a message to effect that the user has been authenticated.

On the other hand, if the receiving portion 130 receives "A1" as battery ID, and receives "B2" as identification information of the electric motorcycle 290, the authenticating portion 110 determines that a user of the management device 104 is not a valid user since user information associated with "A1" and "B2" is not stored in the storage portion 140. That is, the authenticating portion 110 determines that the user is not authenticated. In that case, the transmitting portion 120 transmits, to the management device 104, a message to effect that the user has not been authenticated. The transmitting portion 120 may also transmit a warning to a user identified with "A1".

In that way, the management server 102 associates the "battery ID" with the "electric-motorcycle ID", and manages the "battery ID" and the "electric-motorcycle ID". Consequently, it is more appropriately determined whether the user 190 who uses the management device 104 and the electric motorcycle 290 are a valid combination.

Figure 5:
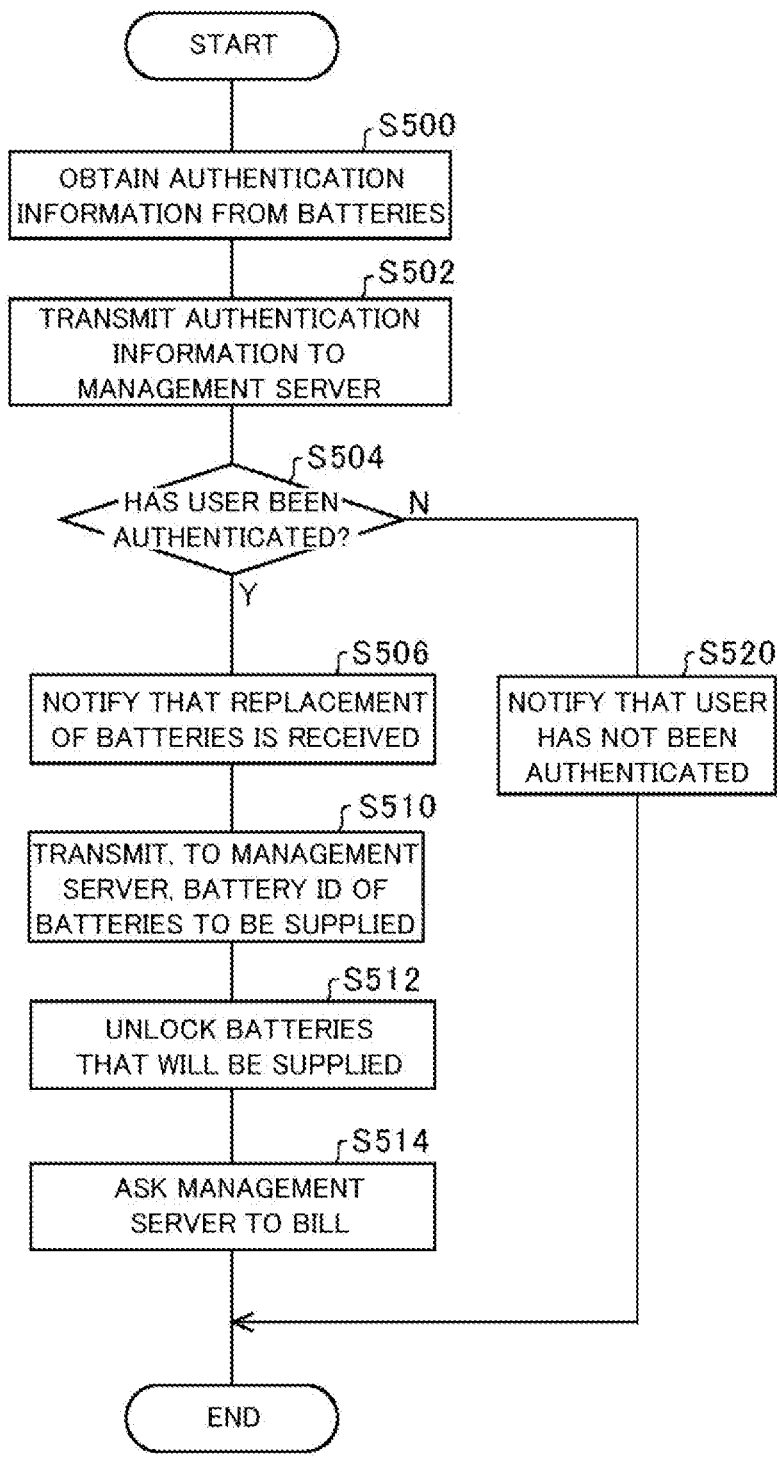
FIG. 5 is a flowchart that illustrates a process related to replacement of batteries at a management device 104.

FIG. 5 is a flowchart that illustrates a process related to replacement of batteries at the management device 104. The process of the present flowchart is started when the batteries 201 are attached to the management device 104.

In S500, authentication information the obtaining portion 210 receives from the batteries 201 may be "electric-motorcycle ID" and "battery ID". The authentication information may be specific information that specifies "electric-motorcycle ID", and "battery ID".

In S502, the authenticating portion 220 transmits authentication information to the management server 102 through the transmitting portion 240.

In S504, the authenticating portion 220 determines whether or not a user has been authenticated. If a message to effect that the user has not been authenticated is received from the management server 102, the control portion 280 notifies the user 190 of an authentication error in S520. The control portion 280 may notify the user of the result of the authentication by blinking a notification lamp of the management device 104 in a predetermined pattern.

If a message to effect that the user has been authenticated is received from the management server 102, the replacement receiving portion 250 may select batteries 202 that is to be supplied to the user 190, and may notify the user that the replacement of the batteries is received in S506. For example, if a signal to effect that the user has been authenticated is received, the control portion 280 may light the notification lamp of the management device 104 to notify the user of the result of the authentication.

In S510, the transmitting portion 240 transmits, to the management server 102, battery ID of the batteries that is to be supplied. If the battery ID is received from the management device 104, the storage portion 140 of the management server 102 stores the battery ID that has been received, and associates the stored battery ID with user information.

In S512, the control portion 280 unlocks accommodated portions of the batteries 202 that is to be supplied. In S514, the transmitting portion 240 notifies the management server 102 through the communication network 209 that the management server 102 is asked to bill.

Figure 6:
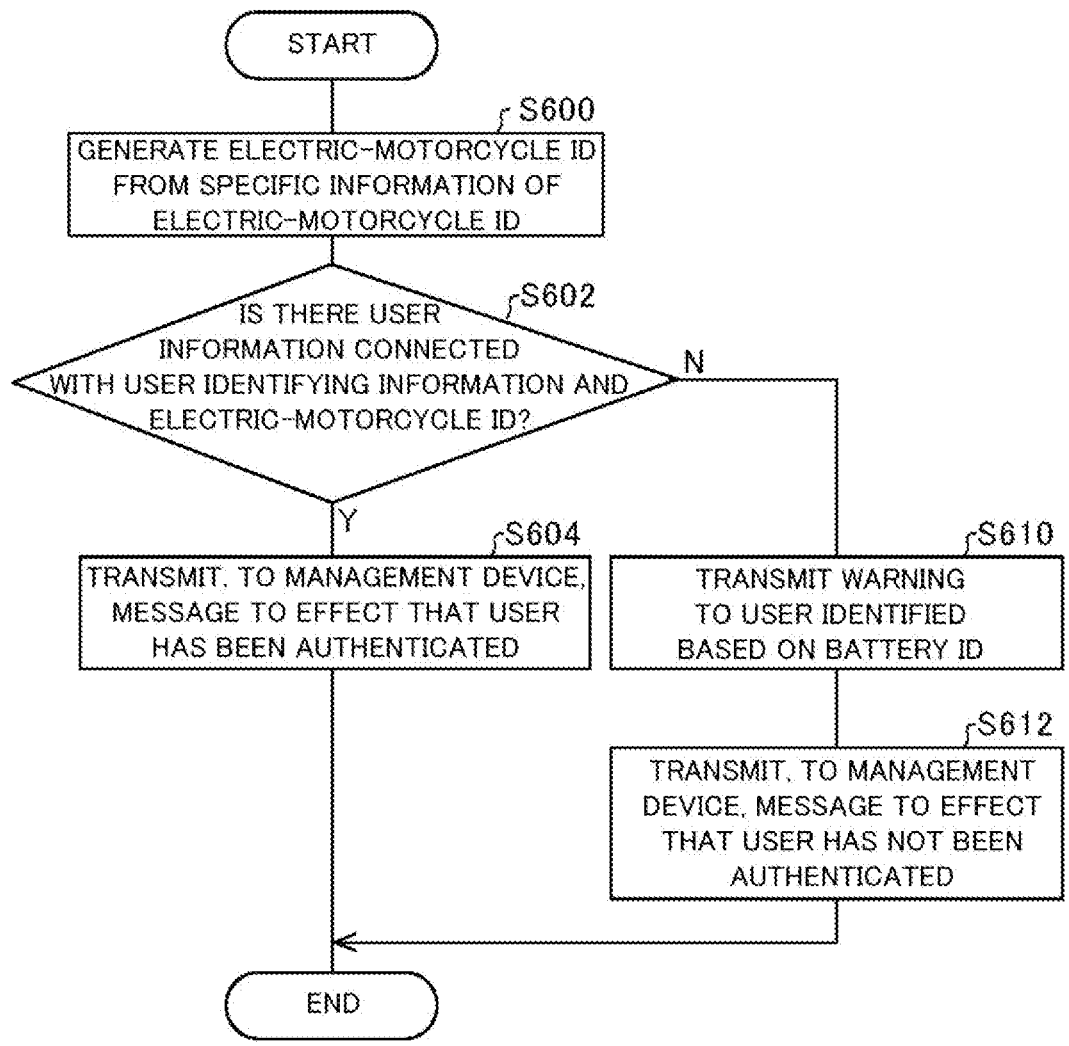
FIG. 6 illustrates authentication operation of the management server 102.

FIG. 6 illustrates authentication operation of the management server 102. A process of the present flowchart is started when the receiving portion 130 receives authentication information.

In S600, the authenticating portion 110 generates electric-motorcycle ID from specific information of the electric-motorcycle ID included in the authentication information. For example, electric-motorcycle ID "AABB" is generated from "0AA" and "1BB", as described above.

In S602, the authenticating portion 110 determines whether or not the storage portion 140 stores user information associated with the electric-motorcycle ID. More specifically, if battery ID is used for authentication, the authenticating portion 110 determines whether or not the storage portion 140 stores user information associated with a combination of the electric-motorcycle ID generated in S600 and the battery ID. If battery ID is not used for authentication, the authenticating portion 110 determines whether or not the storage portion 140 stores user information associated with the electric-motorcycle ID generated in S600.

If the storage portion 140 stores user information associated with the electric-motorcycle ID, the transmitting portion 120 transmits, to the management device 104, a message to effect that the user has been authenticated in S604.

If the storage portion 140 does not store user information associated with the electric-motorcycle ID in S602, the transmitting portion 120 transmits a warning to a user identified based on user information that is stored in the storage portion 140 in association with the battery ID that has been received in S610. Consequently, the user 190 is notified that the batteries may have been stolen from the electric motorcycle 290. In S612, the transmitting portion 120 transmits, to the management device 104, a message to effect that the user has not been authenticated.

In descriptions of FIGS. 4 to 6, a case in which a user is authenticated by reading specific information of electric-motorcycle ID and battery ID from batteries is mainly described. However, an authentication method in which battery ID is not used at all may be adopted. In that case, battery ID is not stored in the storage portion 140 in FIG. 4. Steps related to battery ID are not performed in the flowcharts of FIGS. 5 and 6. A user may select whether or not battery ID is used for authentication, in addition to electric-motorcycle ID.

As described above, the management device 104 identifies the user 190 by using the batteries of the electric motorcycle 290. Therefore, the user 190 is authenticated without extra labor.

Objects managed by the above management system 100 are not limited to the batteries of the electric motorcycle 290. Objects managed by the management system 100 are applicable to management of other various batteries. Objects managed by the management system 100 are not limited to management of batteries. A method using which user authentication and a replaceable member are managed based on information stored in the replaceable member, such as the management device 104, is applicable to various replaceable members, in addition to batteries.

The present invention has been described with reference to the embodiment. However, a technical scope of the present invention is not limited to a scope of the above embodiment. It is obvious to a person skilled in the art to variously vary or modify the above embodiment. Particulars described in a particular embodiment is applicable to another embodiment unless the application causes technical contradiction. The claims clearly disclose that such variations and modifications are included in a technical scope of the present invention.

Note that actions, such as operation, procedures, steps, and stages, in the devices, the systems, the program, and the methods disclosed in the claims, the description, and the drawings are performed in any order unless "before", "in advance", and the like are clearly expressed, or unless output of a preceding action is used in a later action. Even if "First,", "Next,", and the like are used for convenience in descriptions of operational flow in the claims, the description, and the drawings, "First,", "Next,", and the like do not mean that the order is essential.

REFERENCE SIGNS LIST

10 Obtaining portion
20 Authenticating portion
22 Electric motorcycle
30 Replacement receiving portion
41 Battery
42 Battery
50 Management device
60 Vehicle
70 Writing portion
80 Attachment portion
90 User
100 Management system
106 Battery charger
102 Management server
104 Management device
130 Receiving portion
140 Storage portion
110 Authenticating portion
120 Transmitting portion
190 User 201 Battery
202 Battery
209 Communication network
210 Obtaining portion
220 Authenticating portion
230 Writing portion
240 Transmitting portion
250 Replacement receiving portion
280 Control portion
290 Electric motorcycle
300 Control portion
370 Storage portion
380 Electricity storing portion
382 Terminal

What is claimed is:

1. A management device that manages batteries, comprising:
   an obtaining portion that obtains, from the batteries, specific information that specifies identification information of a vehicle that has used the batteries;
   an authenticating portion that authenticates a user by using the specific information obtained from the batteries; and
   a replacement receiving portion that receives replacement of the batteries if the authenticating portion authenticates the user, wherein
   the vehicle uses a plurality of batteries,
   a plurality of pieces of information generated from identification information of the vehicle that has used the plurality of batteries are dispersedly stored as the specific information in the plurality of batteries, and
   when the batteries are attached to the vehicle, the vehicle writes, to the batteries, the specific information that specifies the identification information of the vehicle.

2. The management device according to claim 1, wherein the authenticating portion transmits the specific information to a management server that stores user information in association with the identification information of the vehicle, and obtains, from the management server, a result of authentication of the user.

3. The management device according to claim 1, wherein the obtaining portion further obtains, from the batteries, identification information of the batteries, and
   the authenticating portion authenticates the user by using the specific information obtained from the batteries and the identification information of the batteries obtained from the batteries, wherein the user is a user of the vehicle.

4. The management device according to claim 3, wherein the authenticating portion transmits a combination of the specific information and the identification information of the batteries to a management server that stores user information in association with a combination of identification information of the vehicle and identification information of the batteries, and obtains, from the management server, a result of authentication of the user.

5. The management device according to claim 4, wherein if the management server stores user information in association with a combination of identification information of the vehicle specified by the specific information the management server has received from the management device and the identification information of the batteries the management server has received from the management device, the management server determines that the user is valid.

6. The management device according to claim 4, wherein if the management server does not store user information in association with the combination, the management server notifies a user identified based on user information stored in association with the identification information of the batteries.

7. The management device according to claim 4, further comprising:
   a transmitting portion that transmits, to the management server, identification information of batteries that are to be supplied to the user if the authenticating portion authenticates the user.

8. A management system comprising:
   a management device that manages batteries, including:
     an obtaining portion that obtains, from the batteries, specific information that specifies identification information of a vehicle that has used the batteries;
     an authenticating portion that authenticates a user by using the specific information obtained from the batteries; and
     a replacement receiving portion that receives replacement of the batteries if the authenticating portion authenticates the user, and
   a management server that stores user information in association with the identification information of the vehicle, wherein
   the vehicle uses a plurality of batteries,
   a plurality of pieces of information generated from identification information of the vehicle that has used the plurality of batteries are dispersedly stored as the specific information in the plurality of batteries,
   when the batteries are attached to the vehicle, the vehicle writes, to the batteries, the specific information that specifies the identification information of the vehicle, and
   the authenticating portion transmits the specific information to the management server and obtains, from the management server, a result of authentication of the user.

9. A non-transitory computer-readable storage medium that stores a program of a management device that manages batteries, wherein
   the program allows a computer to execute:
   an obtaining procedure that obtains, from batteries, specific information that specifies identification information of a vehicle that has used the batteries;
   an authenticating procedure that authenticates a user by using the specific information obtained from the batteries; and
   a replacement receiving procedure that receives replacement of the batteries if the user is authenticated by the authenticating procedure, and
   the vehicle uses a plurality of batteries,
   a plurality of pieces of information generated from identification information of the vehicle that has used the plurality of batteries are dispersedly stored as the specific information in the plurality of batteries, and
   when the batteries are attached to the vehicle, the vehicle writes, to the batteries, the specific information that specifies the identification information of the vehicle.

* * * * *